No. 864,794. PATENTED SEPT. 3, 1907.
C. MEYER.
CAR FENDER.
APPLICATION FILED MAY 29, 1907.

Witnesses, Inventor,

UNITED STATES PATENT OFFICE.

CARL MEYER, OF TOLEDO, OHIO.

CAR-FENDER.

No. 864,794.           Specification of Letters Patent.           Patented Sept. 3, 1907.

Application filed May 29, 1907. Serial No. 376,380.

*To all whom it may concern:*

Be it known that I, CARL MEYER, of Toledo, county of Lucas, and State of Ohio, have invented certain new and useful Improvements in Car-Fenders; and I do hereby declare that the following is a full, clear, and exact description thereof, which will enable others skilled in the art to which it appertains to make and use the same, reference being had to the accompanying drawings, and to the figures of reference marked thereon, which form part of this specification.

This invention has reference to car fenders and it has for its object to provide means for causing the forward end of the fender to recede and descend when struck by an object and means for automatically returning the forward end to elevated position when the object is removed.

To this end the invention embodies the novel combination arrangement and details of construction hereinafter shown, described and specifically claimed.

Figure 1:
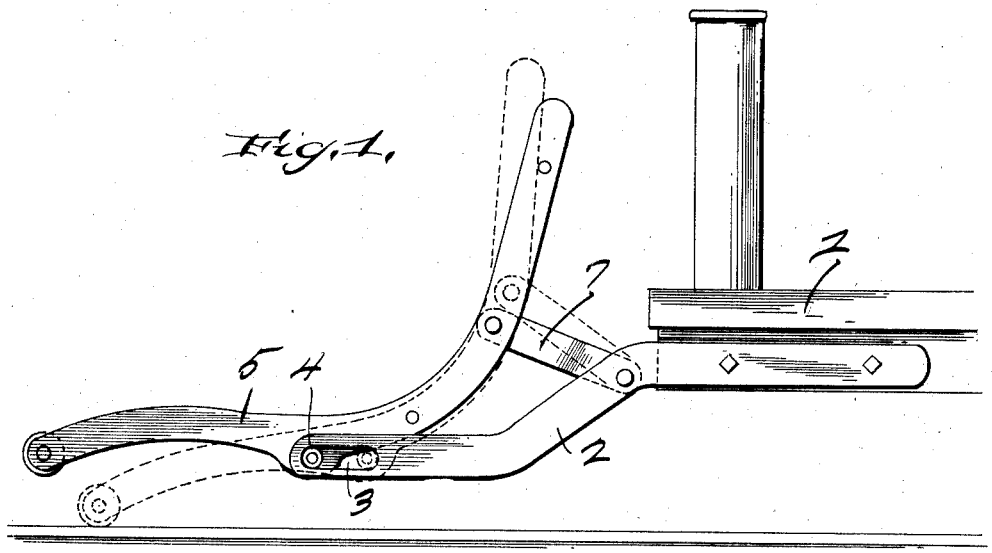
Figure 2:
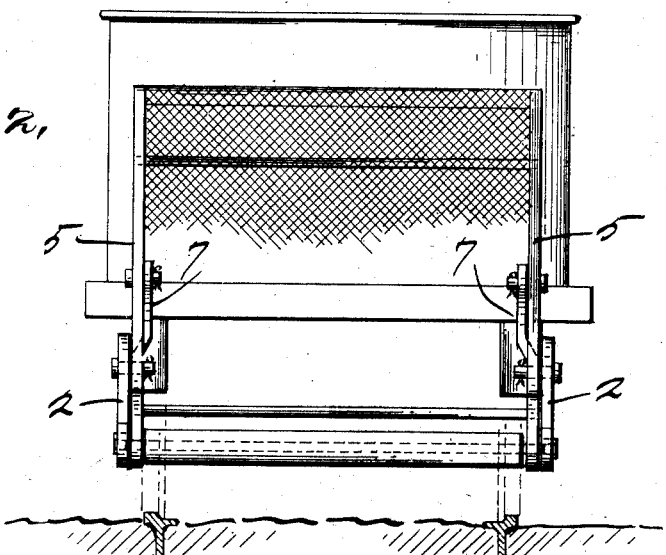

In the accompanying drawings, Figure 1 is a side elevation of a fender attached to a car, the same embodying my invention; Fig. 2 is a front elevation of the same.

Referring to the details, 1 indicates a car having the supporting brackets 2 for the fender secured at its forward end, the brackets being provided at their outer ends with elongated horizontal slots 3 adapted to be traversed by outwardly extending anti-friction rollers 4 secured to the sides 5 of the fender proper, the sides of the fender frame adapted to receive the usual network covering being bent or curved as shown to provide a substantially level forward portion and a substantially vertical rear portion. The rollers 4 are disposed upon the sides of the frame at pivotal points to cause the portion of the fender to the rear of the rollers to overbalance the portion forward of the same, the arrangement being such that the forward portion of the fender will be normally elevated by the excess weight of the rear portion.

To guide the rear portion of the fender in a substantially vertical direction and thereby cause the forward portion to descend, links 7, slightly inclined from the horizontal, are provided to connect the rear portion of the fender with the supporting brackets 2.

In operation, the fender with its forward end normally elevated is shown in full lines, Fig. 1. Upon coming into contact with an object the forward end of the fender will be caused to simultaneously recede and descend, assuming the altered position in dotted outline, the rear end being elevated. The instant the object is removed from the fender, the greater weight of the rear portion will cause the same to descend and consequently automatically return the forward end to elevated position.

Having described my invention, what I claim and desire to secure by Letters Patent, is:—

1. In a car fender, supporting brackets, a movable fender section supported by said brackets and having sliding connection therewith, the portion of the fender section to the rear of its connection with the supporting brackets being of greater weight than the forward portion thereof, and links connecting the rear portion of the fender section with the supporting brackets to guide said rear portion in a substantially vertical direction.

2. In a car fender, brackets provided with elongated, horizontal slots at their outer ends, a fender section provided with anti-friction rollers upon its sides and adapted to traverse the slots in the brackets, the fender section to the rear of said rollers being of greater weight than the portion forward of the same, and links connecting the rear portion of the fender section with the brackets and adapted to guide said rear portion in a substantially vertical direction.

In testimony, that I claim the foregoing as my own I affix my signature, in presence of two witnesses.

CARL MEYER.

Witnesses:
CARL H. KELLER,
M. A. TRACEY.